United States Patent
Tseng

(10) Patent No.: US 8,976,747 B2
(45) Date of Patent: Mar. 10, 2015

(54) APERIODIC SOUNDING REFERENCE SYMBOL CONFIGURATION IN A WIRELESS COMMUNICATION SYSTEM

(75) Inventor: Li-Chih Tseng, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 105 days.

(21) Appl. No.: 13/422,634

(22) Filed: Mar. 16, 2012

(65) Prior Publication Data

US 2012/0250639 A1  Oct. 4, 2012

Related U.S. Application Data

(60) Provisional application No. 61/470,969, filed on Apr. 1, 2011.

(51) Int. Cl.
*H04W 4/00* (2009.01)
*H04L 5/00* (2006.01)

(52) U.S. Cl.
CPC .................................. *H04L 5/0048* (2013.01)
USPC ...................................................... 370/329

(58) Field of Classification Search
USPC .......................... 370/320, 328–339, 350, 441
See application file for complete search history.

(56) References Cited

U.S. PATENT DOCUMENTS

| 8,379,536 B2* | 2/2013 | Montojo et al. ............... 370/252 |
| 2011/0199944 A1* | 8/2011 | Chen et al. ..................... 370/280 |
| 2011/0310818 A1* | 12/2011 | Lin et al. ........................ 370/329 |
| 2012/0263129 A1* | 10/2012 | Noh et al. ...................... 370/329 |
| 2013/0058306 A1* | 3/2013 | Noh et al. ...................... 370/329 |

FOREIGN PATENT DOCUMENTS

| JP | 2012147131 A | 8/2008 |
| JP | 2012147134 A | 8/2012 |
| JP | 2013506383 A | 2/2013 |
| WO | 2011038405 A2 | 3/2011 |
| WO | 2013021556 A1 | 2/2013 |

OTHER PUBLICATIONS

3GPP TSG RAN WG1 Meeting #63, Jacksonville, USA, Nov. 15-19, 2010.
LTE; Evolved Universal Terrestrial Radio Access (E-UTRA); Physical layer procedures (3GPP TS 36,213 version 10.0.1 Release 10).
3GPP TSG RAN WG1 Meeting #63bis, Dublin, Ireland., Jan. 17-21, 2011.

(Continued)

*Primary Examiner* — Frank Duong
(74) *Attorney, Agent, or Firm* — Blue Capital Law Firm, P.C.

(57) ABSTRACT

A method for configuring aperiodic sounding reference symbols is disclosed. The method avoids transmission of unused configuration parameters. In particular, parameters for use with DCI format 4 are not configured for user equipment that does not support the format. Accordingly, the method may include: configuring UL transmission mode equal to 1; configuring aperiodic SRS for DCI format 0/1a; and not configuring aperiodic SRS parameter sets for DCI format 4. The method may also include: configuring UL transmission mode equal to 2; configuring aperiodic SRS for DCI format 0/1a; and not configuring aperiodic SRS parameter sets for DCI format 4.

7 Claims, 4 Drawing Sheets

(56) References Cited

OTHER PUBLICATIONS

3GPP TSG RAN WG1 Meeting #64, Taipei, Taiwan, Feb. 21-25, 2011.
Search Report on corresponding EP Patent Application No. 12002315.5 dated Jun. 22, 2012.
3GPP TSG RAN WG2 Meeting #73, Taipei, Taiwam, Feb. 21-25, 2011.
Office Action on corresponding foreign application (JP 2012-050028) from JPO dated May 7, 2013.
Office Action on corresponding foreign application (KR 10-2012-0031549) from JPO dated Apr. 11, 2013.

\* cited by examiner

APERIODIC SOUNDING REFERENCE SYMBOL CONFIGURATION IN A WIRELESS COMMUNICATION SYSTEM

CROSS-REFERENCE TO RELATED APPLICATIONS

The present application claims the benefit of U.S. Provisional Patent Application Ser. No. 61/470,969, filed on Apr. 1, 2011, the entire disclosure of which is incorporated herein by reference.

FIELD

This disclosure generally relates to wireless communication networks and, more particularly, to configuration of aperiodic sounding reference symbols.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast, and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

According to one aspect, a method of aperiodic sounding reference symbol (SRS) configuration in a wireless communication system, the method comprising: configuring, uplink transmission mode equal to a mode selected from the group consisting of mode 1 and mode 2; and configuring aperiodic SRS for downlink control information (DCI) format 0/1a, wherein aperiodic SRS parameter sets for DCI format 4 are not configured.

According to another aspect, a communication device for use in a wireless communication system, the communication device comprising: a control circuit; a processor installed in the control circuit for executing a program code to command the control circuit; and a memory installed in the control circuit and coupled to the processor, wherein the processor is configured to execute a program code stored in the memory to: configure uplink transmission mode equal to 1; and configure aperiodic sounding reference symbol (SRS) for DCI format 0/1a, wherein the program code does include configuring aperiodic SRS parameter sets for downlink control information (DCI) format 4. Alternatively, the program code stored in the memory may configure uplink transmission mode equal to 2.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced), 3GPP2 UMB (Ultra Mobile Broadband). WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. 3GPP TS 36.212 V10.1.0 ("Multiplexing and channel coding"), 3GPP TS 36.213. V.10.2.0 ("Physical layer procedures"), 3GPP TS 36.300, V.10.2.0 ("E-UTRAN; Overall Description. Stage 2"); and 3GPP TS 36.331 V10.1.0 ("Radio Resource Control (RRC)"). The standards and documents listed above are hereby expressly incorporated herein.

Figure 1:
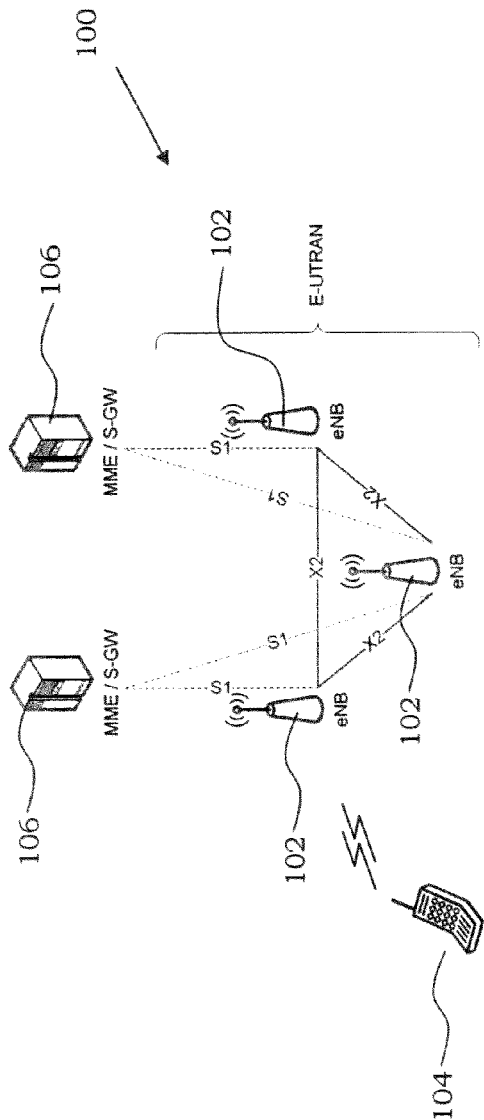
FIG. 1 shows a diagram of a wireless communication system according to one exemplary embodiment.

An exemplary network structure of an Evolved Universal Terrestrial Radio Access Network (E-UTRAN) 100 as a mobile communication system is shown in FIG. 1 according to one exemplary embodiment. The E-UTRAN system can also be referred to as an LTE (Long-Term Evolution) system or LTE-A (Long-Term Evolution Advanced). The E-UTRAN system generally includes eNode B or eNB 102, which function similar to a base station in a mobile voice communication network. Each eNB is connected by X2 interfaces. The eNBs are connected to terminals or user equipment (UE) 104 through a radio interface and are connected to Mobility Management Entities (MME) or Serving Gateway (S-GW) 106 through S1 interfaces.

Figure 3:
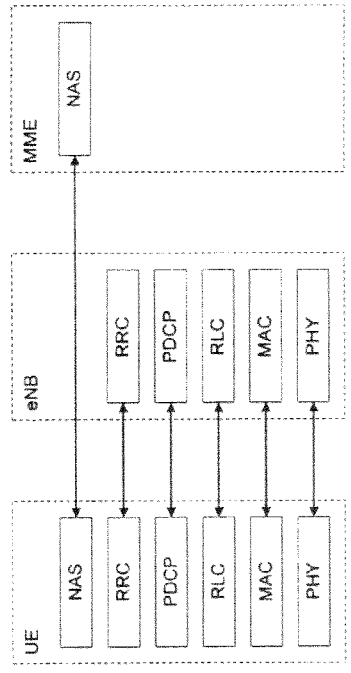
FIG. 3 shows a control plane protocol stack of the wireless communication system of FIG. 1 according to one exemplary embodiment.
Figure 2:
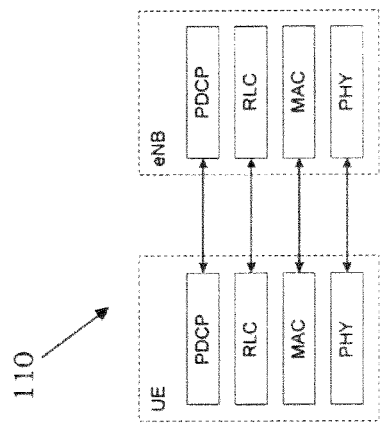
FIG. 2 shows a user plane protocol stack of the wireless communication system of FIG. 1 according to one exemplary embodiment.

Referring to FIGS. 2 and 3, the LTE system is divided into a control plane 108 protocol stack (shown in FIG. 3) and a user plane 110 protocol stack (shown in FIG. 2) according to one exemplary embodiment. The control plane performs a function of exchanging a control signal between a UE and an eNB, and the user plane performs a function of transmitting user data between the UE and the eNB. Both the control plane and the user plane include a Packet Data Convergence Protocol (PDCP) layer, a Radio Link Control (RLC) layer, a Medium Access Control (MAC) layer, and a physical (PHY) layer. The control plane additionally includes a Radio Resource Control (RRC) layer. The control plane also includes a Network Access Stratum (NAS) layer, which performs, among other things. Evolved Packet (EPS management, authentication, and security control.

The PHY layer provides information transmission service using a radio transmission technology and corresponds to the first layer of the open system interconnection (OSI) model. The PHY layer is connected to the MAC layer through a transport channel. Data exchange between the MAC layer and the PHY layer is performed through the transport channel. The transport channel is defined by a scheme through which specific data are processed in the PHY layer.

The MAC layer performs the function of sending data transmitted from the RLC layer through a logical channel to the PHY layer through a proper transport channel and further performs the function of sending data transmitted from the PHY layer through a transport channel to the RLC layer through a proper logical channel. Further, the MAC layer inserts additional information into data received through the logical channel, analyzes the inserted additional information from data received through the transport channel to perform a proper operation, and controls random access operation.

The MAC layer and the RLC layer are connected to each other through a logical channel. The RLC layer controls the setting and release of a logical channel and may operate in one of an acknowledged mode (AM) operation mode, an unacknowledged mode (UM) operation mode and a transparent mode (TM) operation mode. Generally, the RLC layer divides Service Data Unit (SDU) sent from an upper layer at a proper size and vice versa. Further, the RLC layer controls an error correction function through automatic retransmission request (ARQ).

The PDCP layer is above the RLC layer and performs a header compression function of data transmitted in an IP packet form and a function of transmitting data without loss even when a Radio Network Controller (RNC) providing a service changes due to movement of a UE.

The RRC layer is only defined in the control plane. The RRC layer controls logical channels, transport channels and physical channels in relation to establishment, re-configuration, and release of Radio Bearers (RBs). Here, the RB signifies a service provided by the second layer of an OSI layer for data transmissions between the terminal and the E-UTRAN. If an RRC connection is established between the RRC layer of a UE and the RRC layer of the radio network, the UE is in the RRC connected mode. Otherwise, the UE is in an RRC idle mode.

Figure 4:
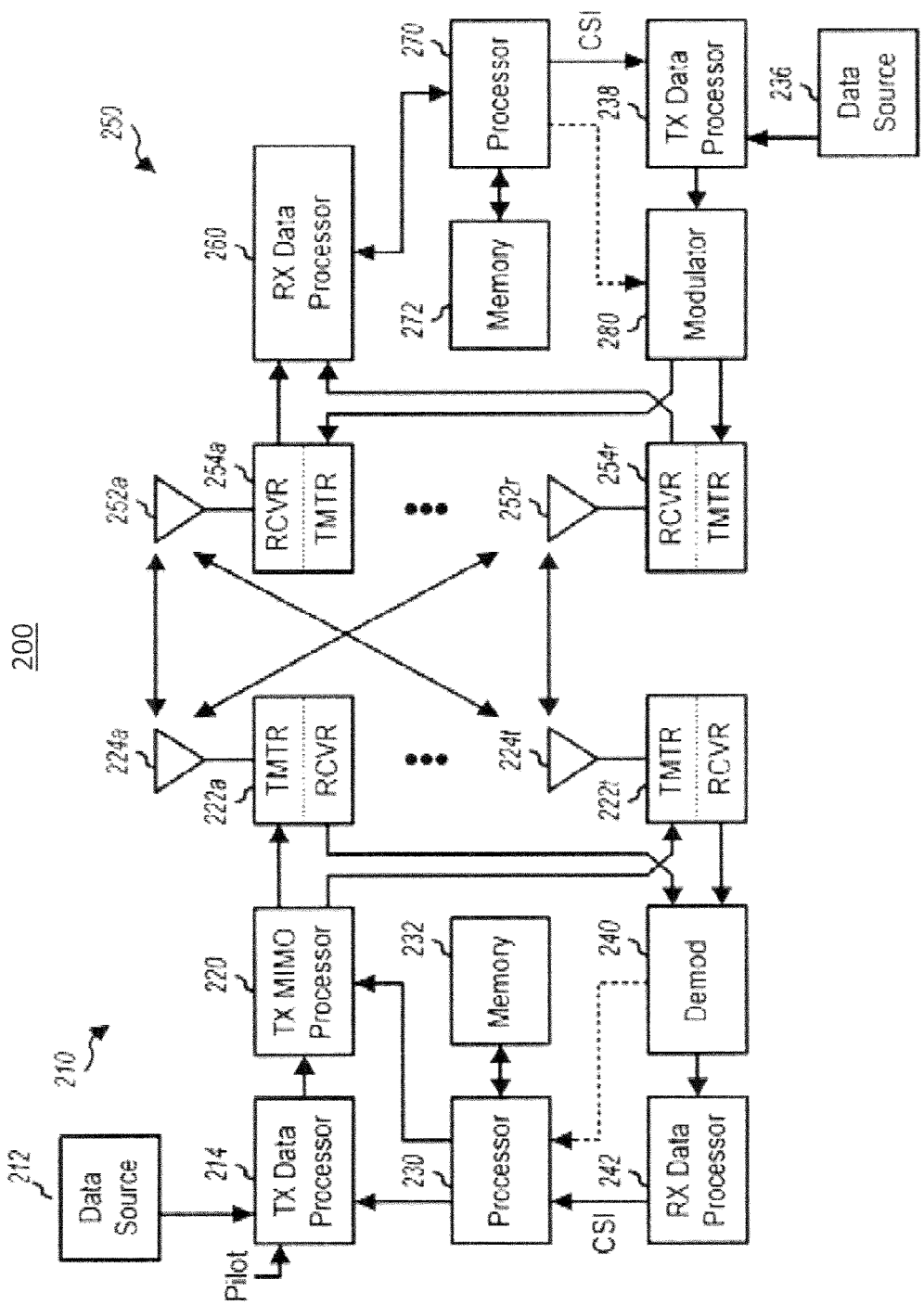
FIG. 4 is a block diagram of a transmitter system (also known as access network) and a receiver system (also known as user equipment or UE) according to one exemplary embodiment.

FIG. 4 is a simplified block diagram of an exemplary embodiment of a transmitter system 210 and a receiver system 250 in a MIMO system 200. At the transmitter system 210, traffic data for a number of data streams is provided from a data source 212 to a transmit (TX) data processor 214.

In one embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by a processor 230.

The modulation symbols for all data streams are then provided to a TX MIMO processor 220 that may further process the modulation symbols (e.g., for OFDM). The TX MIMO processor 220 then provides $N_T$ modulation symbol streams to $N_T$ transmitters (TMTR) 222a through 222t. In certain embodiments, TX MIMO processor 220 applies beam forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for radio transmission. $N_T$ modulated signals from transmitters 222a through 222t are then transmitted from $N_T$ antennas 224a through 224t, respectively.

At the receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding received symbol stream.

An RX data processor 260 receives and processes the $N_R$ received symbol streams from the $N_R$ receivers 254 based on a particular receiver processing technique to provide $N_T$ detected symbol streams. The RX data processor 260 demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use (discussed below). The processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights then processes the extracted message.

Figure 5:
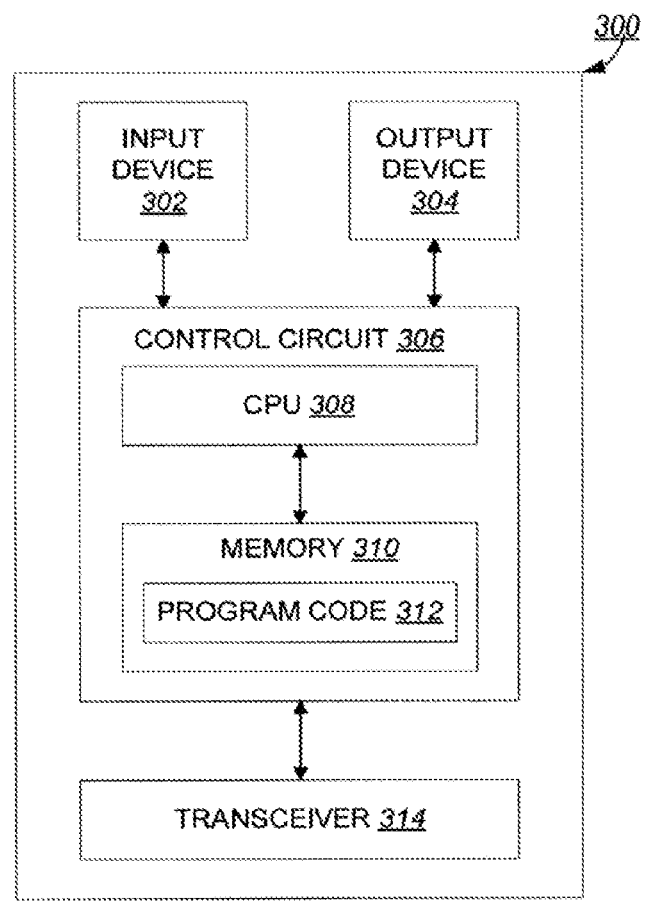
FIG. 5 is a functional block diagram of a UE according to one exemplary embodiment.

Turning to FIG. 5, this figure shows an alternative simplified functional block diagram of a communication device according to one exemplary embodiment. The communication device 300 in a wireless communication system can be utilized for realizing the UE 104 in FIG. 1, and the wireless communications system is preferably the LTE system, the LTE-A system, or the like. The communication device 300 may include an input device 302, an output device 304, a control circuit 306, a central processing unit (CPU) 308, a memory 310 with a program code 312, and a transceiver 314. The program code 312 includes the application layers and the layers of the control plane 108 and layers of user plane 110 as discussed above except the PHY layer. The control circuit 306 executes the program code 312 in the memory 310 through the CPU 308, thereby controlling an operation of the communications device 300. The communications device 300 can receive signals input by a user through the input device 302, such as a camera or a microphone, and can output images and sounds through the output device 304, such as a display or a speaker. The transceiver 314 is used to receive and transmit wireless signals, delivering received signals to the control circuit 306, and outputting signals generated by the control circuit 306.

In a wireless communication system, an eNB may receive sounding reference symbols (SRSs) from user equipments. Sounding reference symbols are sometimes referred to sounding reference signals. The sounding reference symbols may be used by the eNB to estimate characteristics of communication channels between the antennas of the eNB and the user equipment. The eNB may allocate communication resources based on analysis of the channel characteristics. The allocated communication resources are a combination of frequencies and time intervals. Channel characteristics may change over time, for example, when the user equipment or other objects move. Accordingly, the sounding reference symbols may occasionally be resent. Additionally, sounding reference symbols may be sent depending on the allocated communication resources.

As stated in 3GPP TS 36.300, V.10.2.0, uplink reference signals are transmitted in the fourth block of a slot. The uplink reference signals sequence length equals the size (number of sub-carriers) of the assigned resource. The uplink reference signals are based on prime-length Zadoff-Chu sequences that are cyclically extended to the desired length. Multiple reference signals can be created that are based on different Zadoff-Chu sequence from the same set of Zadoff-Chu sequences and/or different shifts of the same sequence.

Additionally, a trigger type 1 is used for triggering aperiodic SRS. When a UE receives Physical Downlink Control Channel (PDCCH) to trigger an aperiodic SRS, the UE will send an SRS with a specific configured timing. As stated in 3GPP TS 36.213, V.10.2.0, a UE shall transmit Sounding Reference Symbol (SRS) on per serving cell SRS resources based on two trigger types: trigger type 0—higher layer signaling; and trigger type 1—DCI formats 0/4/1A for FDD and TDD and DCI formats 2B/2C for TDD. When both trigger type 0 and trigger type 1 SRS transmissions would occur in the same subframe, the UE transmits only the trigger type 1 SRS transmission. A UE may be configured with SRS parameters for trigger type 0 and trigger type 1 on each serving cell. The SRS parameters may be serving cell specific and semi-statically configurable by higher layers for trigger type 0 and for trigger type 1. 3GPP TS 36.213. V.10.2.0 further specified sets of configuration parameters for the various modes. Additionally, 3GPP TS 36.213, V.10.2.0 specifies that when transmission mode 2 is configured for UL, eNB may allocate two UL grants through DCI format 4 (PDCCH) to UE and UE is allowable to use the two grants to send two Transport Blocks (TBs) in the same subframe.

Further, 3GPP TS 36.212 V10.1.0 specifies the use of Downlink Control Information (DCI) format 4 for scheduling of Physical Uplink Shared (PL SCH) in one uplink (UL) cell with multi-antenna port transmission mode. The format includes bits for SRS request configuration. Additionally, 3GPP TS 36.331 V10.1.0 specifies a SoundingRS-UL-Config used uplink SRS configuration. It includes a SoundingRS-UL-ConfigDedicatedAperiodic-r10 parameter field with three SRS-ConfigAp-r10 parameter fields.

The preceding specifications result in the aperiodic SRS parameter set for DCI format 4 always being mandatory when aperiodic SRS is setup. Thus, it would include three sets of parameter sets (i.e., SRS-ConfigAp-r10). However, the UE capability may only support transmission mode 1 for UL (i.e., not support DCI format 4). Additionally, even when UL transmission mode 2 is configured or used, it is still possible for a UE not to use aperiodic SRS for DCI format 4 (i.e., SRS request field on PDCCH DCI format 4 is always '00' indicating no type 1 SRS trigger). Accordingly, there may be DCI signaling a is included but that is not useful.

Figure 6:
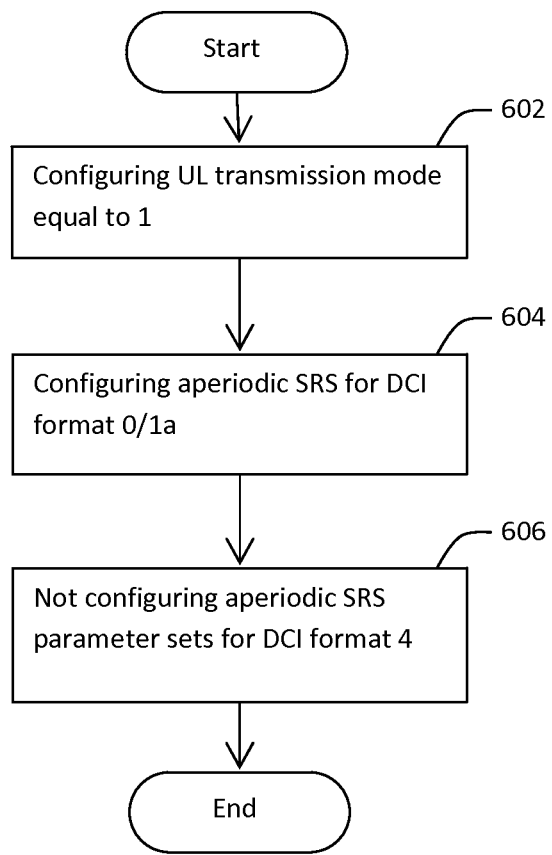
FIG. 6 a flowchart of a process for configuring sounding reference symbols according to one exemplary embodiment.

FIG. 6 a flowchart of a process for configuring sounding reference symbols according to an exemplary embodiment. The process reduces DCI signaling for configuration of SRS parameters. The process may be performed in or associated with the RRC layer of FIG. 3. Additionally, the process may be performed as directed by program code stored in a memory of a UE, for example, as an aperiodic SRS configuration program. When UL transmission mode 1 or 2 is configured and aperiodic SRS is also setup or configured, aperiodic SRS parameter sets for DCI format 4 are not included. Thus, in the case of UL transmission mode 1, when UL transmission mode is changed from 1 to 2, aperiodic SRS parameter sets are configured if not previously configured during the period of UL transmission mode 1.

Determination of whether configuration of aperiodic SRS parameter sets for DCI format 4 may be omitted may be based on capability of UE or based on the current UL transmission mode configuration. In one embodiment, the Information Element (IE) configuration of aperiodic SRS parameter sets for DCI format 4 is made optional. In another embodiment, the IL configuration of aperiodic SRS parameter sets for DCI format 4 is made conditionally optional. For example, the configuration field may be optionally present for UL transmission mode 2, and otherwise the field is not present. For another example, the configuration field may be optionally present if DCI format 4 is supported, and otherwise the field is not present.

As illustrated in FIG. 6, the process includes a step 602 for configuring UL transmission mode equal to 1. Alternatively, the process may configure UL transmission mode equal to 2. In a step 604, the process configures aperiodic SRS for DCI format 0/1a. As illustrated in step 606, the process does not include configuring aperiodic SRS parameter sets for DCI format 4.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory. ROM memory. EPROM memory. EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses, or adaptation of the invention following, in general, the principles of the invention, and including such departures from the present disclosure as come within the known and customary practice within the art to which the invention pertains.

What is claimed is:

1. A method of aperiodic sounding reference symbol (SRS) configuration in a wireless communication system, the method comprising:
   configuring, at a UE (User Equipement), uplink transmission mode equal to a mode selected from the group consisting of mode 1 and mode 2; and
   configuring, at the UE (User Equipement), aperiodic SRS for downlink control information (ICI) format 0/1a, while omitting configuration of aperiodic SRS parameter sets for DCI format 4.

2. The method of claim 1, wherein the method is performed in a network terminal equipment.

3. The method of claim 1, wherein the method is performed in a user equipment.

4. The method of claim 3, wherein the method is performed based o a capability of the user equipment.

5. The method of claim 3, wherein the method is performed based o a an uplink transmission mode configuration of the user equipment.

6. A communication device for use in a wireless communication system, the communication device comprising:
   a control circuit;
   a processor installed in the control circuit for executing a program code to command the control circuit; and
   a memory installed in the control circuit and coupled to the processor,
   wherein the processor is configured to execute a program code stored in the memory to:
      configure uplink transmission mode equal to 1;
      configure aperiodic sounding reference symbol (SRS) for DCI (downlink control information) format 0/1a; and
      omit configuration of aperiodic SRS parameter sets for DC1 format 4.

7. A communication device for use in a wireless communication system, the communication device comprising:
   a control circuit;
   a processor installed in the control circuit for executing a program code to command the control circuit; and
   a memory installed in the control circuit and coupled to the processor,
   wherein the processor is configured to execute a program code stored in the memory to:
      configure uplink transmission mode equal to 2; and
      configure aperiodic sounding reference symbol (SRS) for DCI (downlink control information) format 0/1a; and
      omit configuration of aperiodic SRS parameter sets for DCI format 4.

* * * * *